United States Patent
Harada et al.

(10) Patent No.: US 9,358,871 B2
(45) Date of Patent: Jun. 7, 2016

(54) CONTROL APPARATUS FOR A HYBRID VEHICLE DRIVE SYSTEM

(71) Applicant: TOYOTA JIDOSHA KABUSHIKI KAISHA, Toyota-shi, Aichi (JP)

(72) Inventors: Taku Harada, Nisshin (JP); Masatoshi Ito, Okazaki (JP); Masataka Sugiyama, Toyota (JP); Takuya Kodama, Aichi-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/622,249

(22) Filed: Feb. 13, 2015

(65) Prior Publication Data
US 2015/0239466 A1 Aug. 27, 2015

(30) Foreign Application Priority Data

Feb. 24, 2014 (JP) .................................. 2014-033136

(51) Int. Cl.
| | |
|---|---|
| *B60L 9/00* | (2006.01) |
| *B60K 6/445* | (2007.10) |
| *B60K 6/365* | (2007.10) |
| *B60W 10/06* | (2006.01) |
| *B60W 10/08* | (2006.01) |
| *B60W 10/115* | (2012.01) |

(52) U.S. Cl.
CPC .................. *B60K 6/445* (2013.01); *B60K 6/365* (2013.01); *B60W 10/06* (2013.01); *B60W 10/08* (2013.01); *B60W 10/115* (2013.01); *B60W 20/11* (2016.01); *Y02T 10/6239* (2013.01); *Y02T 10/7077* (2013.01); *Y10S 903/903* (2013.01)

(58) Field of Classification Search
CPC .... B60W 20/20; B60W 20/106; B60K 6/445; Y10S 903/903
USPC ........... 701/22; 180/65.265, 65.235; 903/903, 903/930
See application file for complete search history.

(56) References Cited

U.S. PATENT DOCUMENTS

| | | | |
|---|---|---|---|
| 7,922,618 B2* | 4/2011 | Matsubara et al. ................ 477/3 |
| 9,005,078 B2* | 4/2015 | Hayashi et al. .................... 477/5 |
| 9,020,678 B2* | 4/2015 | Nakajima ........................ 701/22 |
| 2010/0137091 A1 | 6/2010 | Park et al. | |
| 2011/0111906 A1 | 5/2011 | Kim et al. | |
| 2012/0265387 A1 | 10/2012 | Hisada et al. | |
| 2014/0194238 A1 | 7/2014 | Ono et al. | |
| 2015/0094188 A1* | 4/2015 | Kiyokami et al. ................ 477/3 |

FOREIGN PATENT DOCUMENTS

| | | |
|---|---|---|
| JP | 2005-081932 A | 3/2005 |
| JP | 2005-199942 A | 7/2005 |

(Continued)

*Primary Examiner* — Gertrude Arthur Jeanglaud
(74) *Attorney, Agent, or Firm* — Oliff PLC (57) ABSTRACT

A control apparatus for a hybrid vehicle drive system, which permits effective reduction of deterioration of the drivability of the hybrid vehicle. The control apparatus includes a drive mode switching portion 60 configured to switch the hybrid vehicle drive system from a hybrid drive mode to a first EV drive mode if an electric energy amount stored in a battery is smaller than a predetermined threshold value α or if a vehicle drive force required to be generated by the hybrid vehicle drive system is smaller than a predetermined threshold value β, and to a second EV drive mode if the electric energy amount stored in the battery is equal to or larger than the threshold value α and if the drive force required to drive the hybrid vehicle is equal to or larger than the threshold value β, when the drive mode switching portion has determined that the hybrid vehicle drive system should be switched from the hybrid drive mode to the first or second EV drive mode.

2 Claims, 4 Drawing Sheets

(56) References Cited

FOREIGN PATENT DOCUMENTS

| | | |
|---|---|---|
| JP | 4038183 B2 | 1/2008 |
| JP | 2008-265600 A | 11/2008 |
| JP | 2011-098712 A | 5/2011 |
| JP | 2011-156899 A | 8/2011 |
| JP | 2012-224148 A | 11/2012 |
| WO | 2013014777 A1 | 1/2013 |
| WO | 2013/145100 A1 | 10/2013 |

* cited by examiner

|      | CL2 | BK2 |
|------|-----|-----|
| HV1  |     | ○   |
| HV2  | ○   |     |
| EV1  |     | ○   |
| EV2  | ○   | ○   |

| | BK | CL | MODE |
|---|---|---|---|
| EV-1 | O | | 1 |
| EV-2 | O | O | 2 |
| HV-1 | O | | 3 |
| HV-2 | | O | 4 |

CONTROL APPARATUS FOR A HYBRID VEHICLE DRIVE SYSTEM

CROSS REFERENCE TO RELATED APPLICATION

The present application claims the priority from Japanese Patent Application No. 2014-033136 filed on Feb. 24, 2014, the disclosure of which is herein incorporated by reference in its entirety.

BACKGROUND OF THE INVENTION

1. Field of the Invention

The present invention relates to an improvement of a control apparatus for a drive system of a hybrid vehicle.

2. Description of Related Art

There is proposed a technique for switching a hybrid vehicle drive system provided with an electric motor functioning as a vehicle drive power source in addition to an internal combustion engine, between a hybrid drive mode and an EV drive mode. In the hybrid drive mode, the engine and the electric motor are operated as the vehicle drive power source to drive the hybrid vehicle. In the EV drive mode, the electric motor is operated as the vehicle drive power source to drive the hybrid vehicle while the engine is held at rest. JP-2011-156899 A discloses an example of such a hybrid vehicle drive system, which is preferentially placed in the EV drive mode when an amount of an electric energy stored in a battery is comparatively large, whereby deterioration of drivability of the hybrid vehicle can be prevented. Further, JP-2011-098712 A discloses an example of a hybrid vehicle drive system including: a differential device which has a first differential mechanism and a second differential mechanism and which has four rotary components; and an engine, a first electric motor, a second electric motor and an output rotary member which are respectively connected to said four rotary components. This hybrid vehicle drive system is configured to be switched to a selected one of a plurality of hybrid drive modes and a plurality of EV drive modes, according to a selected one of a plurality of combinations of the operating states of a plurality of coupling elements.

Where the hybrid vehicle drive system is switched to the selected one of the drive modes on the basis of a required vehicle drive force and the amount of the electric energy stored in the battery, as in the prior art described above, the frequency of change of the operating states of the coupling elements from one combination to another increases with the number of the vehicle drive modes available, so that a drive mode switching control of the hybrid vehicle drive system suffers from a time lag or a low degree of drive mode switching response, giving rise to a problem of deterioration of the drivability of the hybrid vehicle. This problem was first discovered by the present inventors in the process of an intensive study in an effort to improve the performance of the hybrid vehicle.

SUMMARY OF THE INVENTION

The present invention was made in view of the background art described above. It is therefore an object of the present invention to provide a control apparatus for a hybrid vehicle drive system, which permits effective reduction of deterioration of the drivability of the hybrid vehicle.

The object indicated above is achieved according to a first aspect of the present invention, which provides a control apparatus for a hybrid vehicle drive system including: a differential device which comprises a first differential mechanism and a second differential mechanism and which comprises four rotary components; and an engine, a first electric motor, a second electric motor and an output rotary member which are respectively connected to the above-described four rotary components, the control apparatus comprising a drive mode switching portion configured to place the above-described hybrid vehicle drive system in one of a hybrid drive mode in which an output torque of the above-described engine and an output torque of at least one of the above-described first and second electric motors are transmitted to the above-described output rotary member; a first EV drive mode in which only the output torque of the above-described second electric motor is transmitted to the above-described output rotary member; and a second EV drive mode in which only the output torques of the above-described first and second electric motors are transmitted to the above-described output rotary member, wherein the above-described drive mode switching portion is further configured to switch the hybrid vehicle drive system from the above-described hybrid drive mode to the above-described first EV drive mode if an electric energy amount stored in a battery is smaller than a predetermined battery threshold value or if a vehicle drive force required to be generated by the above-described hybrid vehicle drive system is smaller than a predetermined drive force threshold value, and to the above-described second EV drive mode if the electric energy amount stored in the above-described battery is equal to or larger than the above-described battery threshold value and if the above-described drive force required to drive the hybrid vehicle is equal to or larger than the above-described drive force threshold value, when the above-described drive mode switching portion has determined that the hybrid vehicle drive system should be switched from the above-described hybrid drive mode to the above-described first or second EV drive mode.

In the control apparatus according to the first aspect of the invention described above, the above-described drive mode switching portion is further configured to switch the hybrid vehicle drive system from the above-described hybrid drive mode to the above-described first EV drive mode if the electric energy amount stored in the battery is smaller than the predetermined battery threshold value or if the vehicle drive force required to be generated by the above-described hybrid vehicle drive system is smaller than the predetermined drive force threshold value, and to the above-described second EV drive mode if the electric energy amount stored in the above-described battery is equal to or larger than the above-described battery threshold value and if the above-described drive force required to drive the hybrid vehicle is equal to or larger than the above-described drive force threshold value, when the above-described drive mode switching portion has determined that the hybrid vehicle drive system should be switched from the above-described hybrid drive mode to the above-described first or second EV drive mode. Thus, the hybrid vehicle drive system is placed in the second EV drive mode when the required vehicle drive force is relatively large while the electric energy amount stored in the battery is sufficiently large, so that it is possible to effectively reduce deterioration of the drivability of the hybrid vehicle due to a change of the vehicle drive mode during acceleration of the hybrid vehicle. Namely, the first aspect of the invention provides a control apparatus for a hybrid vehicle drive system, which permits effective reduction of deterioration of the drivability of the hybrid vehicle.

According to a second aspect of the invention, the hybrid vehicle drive system to be controlled by the control apparatus according to the first aspect of the invention is configured such that one of the above-described four rotary components is constituted by a rotary element of the above-described first differential mechanism and a rotary element of the above-described second differential mechanism which are selectively connected to each other through a clutch, while one of the rotary elements of the above-described first and second differential mechanisms which are selectively connected to each other through the above-described clutch is selectively connected to a stationary member through a brake, the control apparatus further comprising a clutch engagement control portion configured to place the above-described clutch in an engaged state when the electric energy amount stored in the above-described battery is equal to or larger than the above-indicated predetermined battery threshold value. According to this second aspect of the invention wherein the clutch is brought into the engaged state, when the hybrid vehicle drive system is expected to be switched to the above-indicated second EV drive mode while the electric energy amount stored in the battery is sufficiently large, it is possible to effectively prevent deterioration of the drivability of the hybrid vehicle due to a delayed engaging action of the clutch.

DETAILED DESCRIPTION OF PREFERRED EMBODIMENTS

The differential device which comprises the above-described first and second differential mechanisms and to which the present invention is applicable comprises four rotary components when the above-described clutch is placed in the engaged state. The differential device may further comprise another clutch disposed between the selected rotary elements, in addition to the clutch indicated above. The differential device may further comprise another brake disposed between the selected rotary element and the above-described stationary member, in addition to the above-described brake. The differential device may further comprise a clutch disposed between an output shaft of the engine and the differential mechanism.

The hybrid vehicle drive system is configured to selectively establish a plurality of vehicle drive modes depending upon operating states of the engine and the first and second electric motors and the operating states of the above-described clutch and brake. Preferably, the plurality of vehicle drive modes include: a first EV drive mode in which the above-described second electric motor selected from the above-described engine and the above-described first and second electric motors provided as a vehicle drive power source is primarily operated as the vehicle drive power source, and an output torque of the second electric motor is transmitted to the output rotary member to drive the hybrid vehicle, in the released state of the above-described clutch and in the engaged state of the above-described brake while the above-described engine is held at rest; and a second EV drive mode in which the above-described first and second electric motors selected from the above-described engine and the above-described first and second electric motors are primarily operated, and output torques of the first and second electric motors are transmitted to the output rotary member to drive the hybrid vehicle, in the engaged states of both of the above-described clutch and brake while the above-described engine is held at rest.

Referring to the drawings, preferred embodiments of the present invention will be described in detail. It is to be understood that the drawings referred to below do not necessarily accurately represent ratios of dimensions of various elements.

First Embodiment

Figure 1:
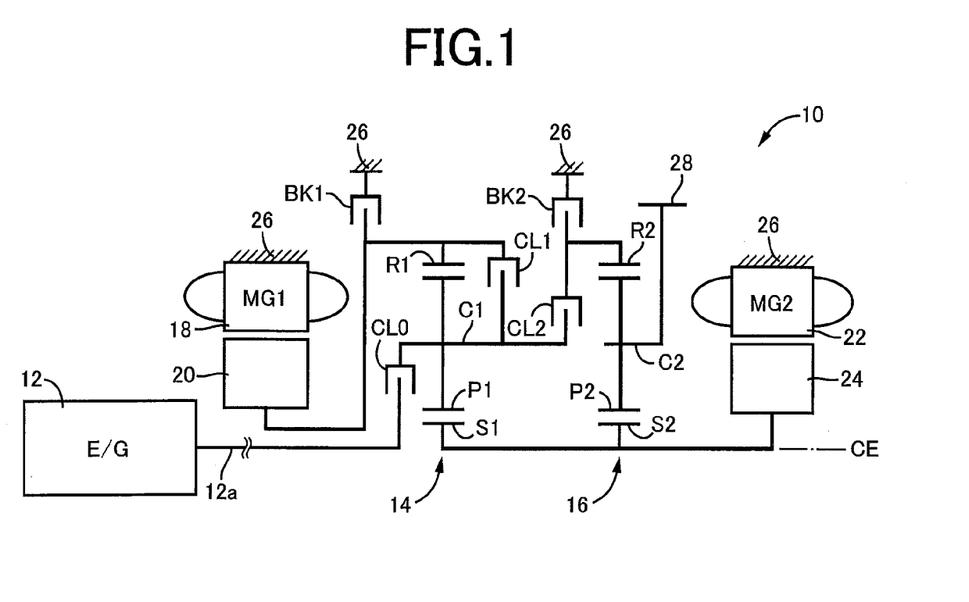
FIG. 1 is a schematic view showing an example of an arrangement of a hybrid vehicle drive system to which the present invention is suitably applicable.

FIG. 1 is the schematic view showing an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common axis CE. In the following description of the embodiments, the direction of extension of this axis CE will be referred to as an "axial direction". The drive system 10 is constructed substantially symmetrically with respect to the axis CE. In FIG. 1, a lower half of the drive system 10 is not shown.

The engine 12 is an internal combustion engine such as a gasoline engine, which is operable to generate a drive force by combustion of a fuel such as a gasoline injected into its cylinders. Each of the first and second electric motors MG1 and MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio p1 and which includes rotary elements consisting of: a first rotary element in the form of a ring gear R1; a second rotary element in the form of a carrier C1 supporting a pinion gear P1 such that the pinion gear P1 is rotatable about its axis and the axis of the planetary gear set; and a third rotary element in the form of a sun gear S1 meshing with the ring gear R1 through the pinion gear P1. The second planetary gear set 16 is a single-pinion type planetary gear set which has a gear ratio p2 and which includes rotary elements consisting of: a first rotary element in the form of a ring gear R2; a second rotary element in the form of a carrier C2 supporting a pinion gear P2 such that the pinion gear P2 is rotatable about its axis and the axis of the planetary gear set; and a third rotary element in the form of a sun gear S2 meshing with the ring gear R2 through the pinion gear P2.

In the first planetary gear set 14, the ring gear R1 is fixed to the rotor 20 of the first electric motor MG1, and the carrier C1 is selectively connectable through a clutch CL0 to an output shaft of the engine 12 in the form of a crankshaft 12a, while the sun gear S1 is fixed to the sun gear S2 of the second planetary gear set 16 and the rotor 24 of the second electric motor MG2. In the second planetary gear set 16, the carrier C2 is fixed to an output rotary member in the form of an output gear 28. A drive force received by the output gear 28 is transmitted to a pair of right and left drive wheels (not shown) through a differential gear device and axles (not shown). A torque received by the drive wheels from a roadway surface during running of the hybrid vehicle is transmitted from the output gear 28 to the drive system 10 through the differential gear device and axles.

The clutch CL0 for selectively connecting and disconnecting the carrier C1 of the first planetary gear set 14 to and from the crankshaft 12a of the engine 12 is disposed between the crankshaft 12a and the carrier C1. A clutch CL1 for selectively connecting and disconnecting the carrier C1 to and from the ring gear R1 is disposed between the carrier C1 and the ring gear R1. A clutch CL2 for selectively connecting and disconnecting the carrier C1 to and from the ring gear R2 of the second planetary gear set 16 is disposed between the carrier C1 and the ring gear R2. A brake BK1 for selectively fixing the ring gear R1 to the stationary member in the form of the housing 26 is disposed between the ring gear R1 and the housing 26. A brake BK2 for selectively fixing the ring gear R2 to the housing 26 is disposed between the ring gear R2 and the housing 26.

In the drive system 10, the differential device including the first and second planetary gear sets 14 and 16 has four rotary components when the clutch CL2 is placed in the engaged state. In other words, the drive system 10 is provided with: the differential device (14, 16); and the engine 12, the first electric motor MG1, the second electric motor MG2 and the output gear 28, which are respectively connected to the four rotary components of the differential device. Relative rotating speeds of the four rotary components are represented by a collinear chart in the form of a two-dimensional coordinate system in which gear ratios of the first and second planetary gear sets 14 and 16 are taken along a horizontal axis, while the relative rotating speeds of the four rotary components are taken along a vertical axis. One of the four rotary components is constituted by the carrier C1 of the first planetary gear set 14 and the ring gear R2 of the second planetary gear set 16, which are selectively connected to each other through the clutch CL2, and the ring gear R2 selectively connected to the carrier C1 is selectively fixed to the housing 26 through the brake BK2.

In the present embodiment, the clutch CL2 serves as a clutch configured to selectively connect the second rotary element of the first planetary gear set 14 in the form of the carrier C1 and the first rotary element of the second planetary gear set 16 in the form of the ring gear R2, while the brake BK2 serves as a brake configured to selectively fix the ring gear R2 of the second planetary gear set 16 (connectable to the carrier C1 through the clutch CL2) to the stationary member in the form of the housing 26. The drive system 10 need not be provided with the clutch CL0. That is, in the absence of the clutch CL0, the crankshaft 12a of the engine 12 may be directly fixed to the carrier C1 of the first planetary gear set 14, or indirectly through a damper, for instance. Further, the drive system 10 need not be provided with the clutch CL1 and the brake BK1.

Each of the clutches CL0, CL1 and CL2 (hereinafter collectively referred to as "clutches CL" unless otherwise specified), and the brakes BK1 and BK2 (hereinafter collectively referred to as "brakes BK" unless otherwise specified) is preferably a hydraulically operated coupling device an operating state of which is controlled (which is engaged and released) according to a hydraulic pressure applied thereto from a hydraulic control unit 54. While wet multiple-disc type frictional coupling devices are preferably used as the clutches CL and brakes BK, meshing type coupling devices, namely, so-called dog clutches (claw clutches) may also be used. Alternatively, the clutches CL and brakes BK may be electromagnetic clutches, magnetic powder clutches and any other clutches the operating states of which are controlled (which are engaged and released) according to electric commands generated from an electronic control device 30.

Figure 2:
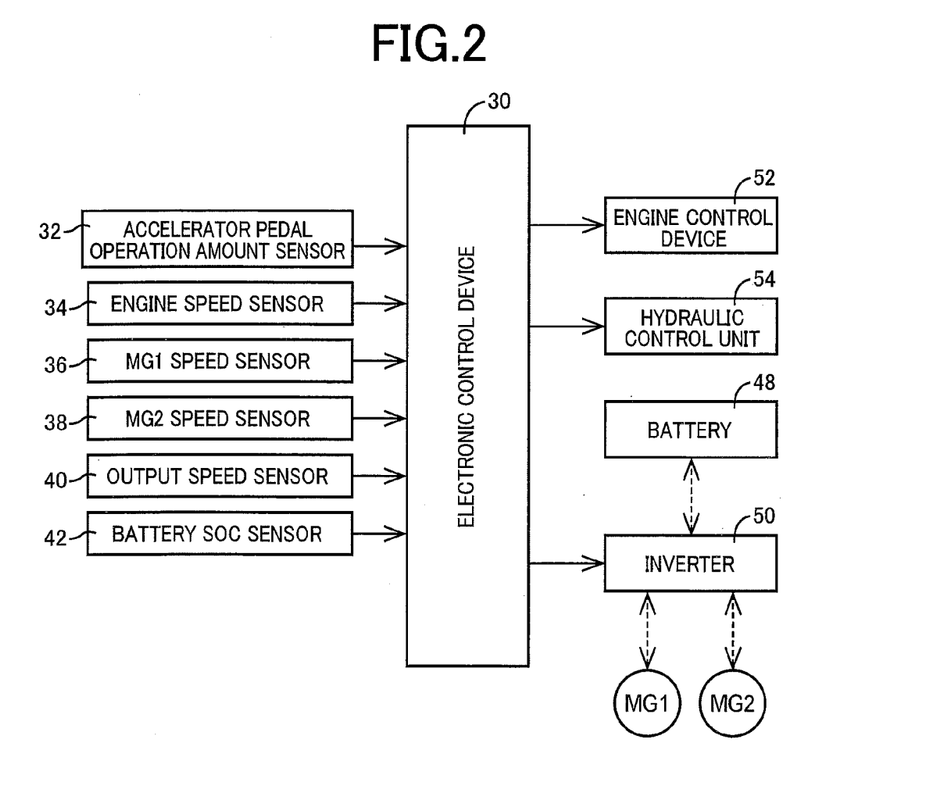
FIG. 2 is a block diagram illustrating major portions of a control system provided to control the drive system of FIG. 1.

FIG. 2 is the block diagram illustrating major portions of a control system provided to control the drive system 10. The electronic control device 30 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first and second electric motors MG1 and MG2. In the present embodiment, the electronic control device 30 serves as a control apparatus for the drive system 10. The electronic control device 30 may be constituted by mutually independent control units as needed for respective controls such as an output control of the engine 12 and drive controls of the first and second electric motors MG1 and MG2.

As indicated in FIG. 2, the electronic control device 30 is configured to receive various signals from sensors and switches provided in the drive system 10. Namely, the electronic control device 30 receives: an output signal of an accelerator pedal operation amount sensor 32 indicative of an operation amount or angle $A_{CC}$ of an accelerator pedal (not shown), which corresponds to a vehicle output required by a vehicle operator; an output signal of an engine speed sensor 34 indicative of an engine speed $N_E$, that is, an operating speed of the engine 12; an output signal of an MG1 speed sensor 36 indicative of an operating speed $N_{MG1}$ of the first electric motor MG1; an output signal of an MG2 speed sensor 38 indicative of an operating speed $N_{MG2}$ of the second electric motor MG2; an output signal of a running speed detector in the form of an output speed sensor 40 indicative of a rotating speed $N_{OUT}$ of the output gear 28, which corresponds to a running speed V of the hybrid vehicle; and an output signal of a battery SOC sensor 42 indicative of an electric energy amount SOC stored in a battery 48 (a state of charge SOC of the battery 48).

The electronic control device 30 is also configured to generate various control commands to be applied to various portions of the drive system 10. Namely, the electronic control device 30 applies, to an engine control device 52, engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 30 applies command signals to an inverter 50, for controlling operations of the first and second electric motors MG1 and MG2, so that the first and second electric motors MG1 and MG2 are operated with electric energies supplied thereto from the battery 48 through the inverter 50 according to the command signals to control outputs (output torques) of the electric motors MG1 and MG2. Electric energies generated by the first and second electric motors MG1 and MG2 are supplied to and stored in the battery 48 through the inverter 50. Further, the electronic control device 30 applies command signals for controlling the operating states of the clutches CL and brakes BK, to linear solenoid valves and other electromagnetic control valves provided in the hydraulic control unit 54, so that hydraulic pressures generated by those electromagnetic control valves are controlled to control the operating states of the clutches CL and brakes BK.

An operating state of the drive system 10 is controlled through the first and second electric motors MG1 and MG2, such that the drive system 10 functions as an electrically controlled differential portion whose difference of input and output speeds is controllable. For example, an electric energy generated by the first electric motor MG1 is supplied to the battery 48 or the second electric motor MG2 through the inverter 50. Namely, a major portion of the drive force of the engine 12 is mechanically transmitted to the output gear 28, while the remaining portion of the drive force is consumed by the first electric motor MG1 operating as the electric generator, and converted into the electric energy, which is supplied to the second electric motor MG2 through the inverter 50, so that the second electric motor MG2 is operated to generate a drive force to be transmitted to the output gear 28. Components associated with the generation of the electric energy and the consumption of the generated electric energy by the second electric motor MG2 constitute an electric path through which a portion of the drive force of the engine 12 is converted into an electric energy which is converted into a mechanical energy.

Figure 3:
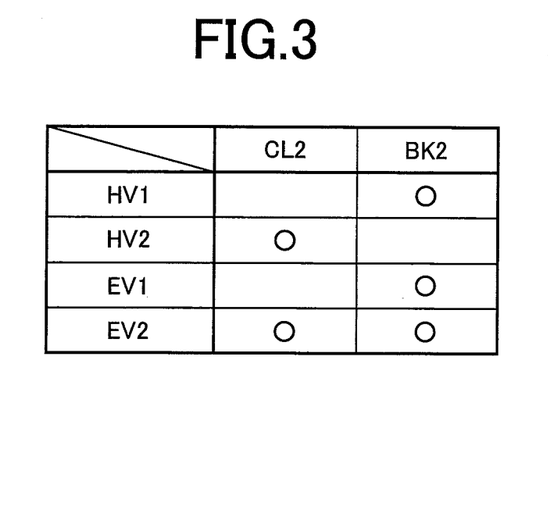
FIG. 3 is a table indicating combinations of operating states of a clutch and a brake, which correspond to respective four vehicle drive modes to be established in the drive system of FIG. 1.

In the hybrid vehicle provided with the drive system 10 constructed as described above, a selected one of a plurality of vehicle drive modes is established according to operating states of the engine 12 and the first and second electric motors MG1 and MG2, and the operating states of the clutches CL and brakes BK. FIG. 3 is the table indicating combinations of the operating states of the clutch CL2 and brake BK2, which correspond to the respective four vehicle drive modes of the drive system 10. In this table, "o" marks represent the engaged states of the clutch CL2 and brake BK2 while blanks represent their released states. Drive modes HV1 and HV2 indicated in FIG. 3 are hybrid drive modes in which the engine 12 is operated as the vehicle drive power source while the first and second electric motors MG1 and MG2 are operated as needed to generate a vehicle drive force and/or an electric energy. In these hybrid drive modes, at least one of the first and second electric motors MG1 and MG2 can be operated to generate a reaction force or placed in a non-loaded free state. Drive modes EV1 and EV2 indicated in FIG. 3 are EV drive modes in which the engine 12 is held at rest while at least one of the first and second electric motors MG1 and MG2 is used as a vehicle drive power source.

While the drive system 10 in the present embodiment is placed in one of the four different drive modes as indicated in FIG. 3, the drive system 10 may be configured to be placed in a selected one of a plurality of constant-speed-ratio drive modes, according to a selected one of different combinations of the operating states of the clutch CL1 and the brake BK1, for instance. In the constant-speed-ratio drive modes, the drive system 10 has respective different speed values of a speed ratio of a power transmitting path from the engine 12 to the output gear 28. Namely, the clutch CL1 and the brake BK1 provided in the drive system 10 are placed in the engaged or released state as needed depending upon the running state of the hybrid vehicle provided with the drive system 10. The following description of the plurality of drive modes corresponding to the respective combinations of the operating states of the clutch CL2 and brake BK2 is based on an assumption that the clutch CL1 and brake BK1 are both placed in the released states.

In the drive mode HV1 indicated in FIG. 3, the carrier C1 of the first planetary gear set 14 and the ring gear R2 of the second planetary gear set 16 are rotatable relative to each other in the released state of the clutch CL2, while the ring gear R2 is fixed to the stationary member in the form of the housing 26 in the engaged state of the brake BK2, so that the rotating speed of the ring gear R2 is held at zero. In this drive mode HV1, the engine 12 is operated so that the output gear 28 is rotated by an output torque of the engine 12. At this time, the first electric motor MG1 generates a reaction torque in the first planetary gear set 14, to enable the output of the engine 12 to be transmitted to the output gear 28. In the second planetary gear set 16, the carrier C2, that is, the output gear 28 is rotated in a positive direction by an output torque of the second electric motor MG2 if generated in a positive direction in the engaged state of the brake BK2.

In the drive mode HV2 indicated in FIG. 3, the carrier C1 of the first planetary gear set 14 and the ring gear R2 of the second planetary gear set 16 are not rotatable relative to each other in the engaged state of the clutch CL2, that is, the carrier C1 and the ring gear R2 are rotated as a single rotary component. The sun gear S1 and the sun gear S2 are fixed to each other, and are rotated as a single rotary component. Namely, when the drive system 10 is placed in the drive mode HV2, the differential device consisting of the first and second planetary gear sets 14 and 16 has four rotary components: the ring gear R1 (fixed to the first electric motor MG1); a rotary component constituted by the carrier C1 and the ring gear R2 which are connected to each other (and to the engine 12); the carrier C2 (fixed to the output gear 28); and a rotary component constituted by the sun gears S1 and S2 which are fixed to each other (and to the second electric motor MG2).

In the drive mode HV2, the carrier C1 of the first planetary gear set 14 and the ring gear R2 of the second planetary gear set 16 are connected to each other through the clutch CL2 placed in the engaged state, and are rotated as a single rotary component, so that any of the first and second electric motors MG1 and MG2 can receive a reaction force in response to the engine output. Namely, either one or both of the first and second electric motors MG1 and MG2 can be assigned to receive the reaction force during engine operation, making it possible to operate the drive system 10 with a high degree of operating efficiency, and to permit the hybrid vehicle to run with reduced torque limitation due to heat generation.

In the drive mode EV1 indicated in FIG. 3, the carrier C1 of the first planetary gear set 14 and the ring gear R2 of the second planetary gear set 16 are rotatable relative to each other in the released state of the clutch CL2, while the ring gear R2 is fixed to the stationary member in the form of the housing 26 in the engaged state of the brake BK2, so that the rotating speed of the ring gear R2 is held at zero. In this drive mode EV1, the carrier C2 in the second planetary gear set 16, that is, the output gear 28 is rotated in the positive direction by the output torque of the second electric motor MG2 if generated in the positive direction. That is, the hybrid vehicle provided with the drive system 10 can be driven in the forward direction by the positive torque generated by the second electric motor MG2. When the second electric motor MG2 is operated, the first electric motor MG1 is preferably placed in a free state.

In the drive mode EV2 indicated in FIG. 3, the carrier C1 of the first planetary gear set 14 and the ring gear R2 of the second planetary gear set 16 are not rotatable relative to each other in the engaged state of the clutch CL2, while the ring gear R2 and the carrier C1 of the first planetary gear set 14 which is fixed to the ring gear R2 are fixed to the stationary member in the form of the housing 26 by further placing the brake BK2 in the engaged state, so that the rotating speed of the ring gear R2 and the carrier C1 is held at zero. In this drive mode EV2, the rotating directions of the ring gear R1 and the sun gear S1 in the first planetary gear set 14 are opposite to each other. Namely, the carrier C2, that is, the output gear 28 is rotated in a positive direction by a negative torque generated by the first electric motor MG1, and by a positive torque generated by the second electric motor MG2. That is, the hybrid vehicle provided with the drive system 10 can be driven in the forward direction by an output torque or output torques of at least one of the first and second electric motors MG1 and MG2.

In the drive mode EV2, at least one of the first and second electric motors MG1 and MG2 may be operated as an electric generator. In this case, one or both of the first and second electric motors MG1 and MG2 can be assigned to generate a vehicle drive force (torque), with a high degree of operating efficiency, permitting the hybrid vehicle to run with reduced torque limitation due to heat generation. Further, at least one of the first and second electric motors MG1 and MG2 may be held in a free state, when the generation of an electric energy by a regenerative operation of the electric motors MG1 and MG2 is inhibited in a fully charged state of the battery 48. Namely, the drive mode EV2 can be established under various running conditions of the hybrid vehicle, or may be kept for a relatively long length of time. Accordingly, the drive mode EV2 is advantageously provided on a hybrid vehicle such as a plug-in hybrid vehicle, which is frequently placed in an EV drive mode.

In the present embodiment, the drive modes HV1 and HV2 indicated in FIG. 3 correspond to hybrid drive modes in which the output torque of the engine 12 and the output torque or torques of at least one of the first and second electric motors MG1 and MG2 are transmitted to the output gear 28, and the drive mode EV1 corresponds to a first EV drive mode in which only the output torque of the second electric motor MG2 of the engine 12, the first electric motor MG1, and the second electric motor MG2 is transmitted to the output gear 28, while the drive mode EV2 corresponds to a second EV drive mode in which the output torques of the first and second electric motors MG1 and MG2 are transmitted to the output gear 28.

Figure 4:
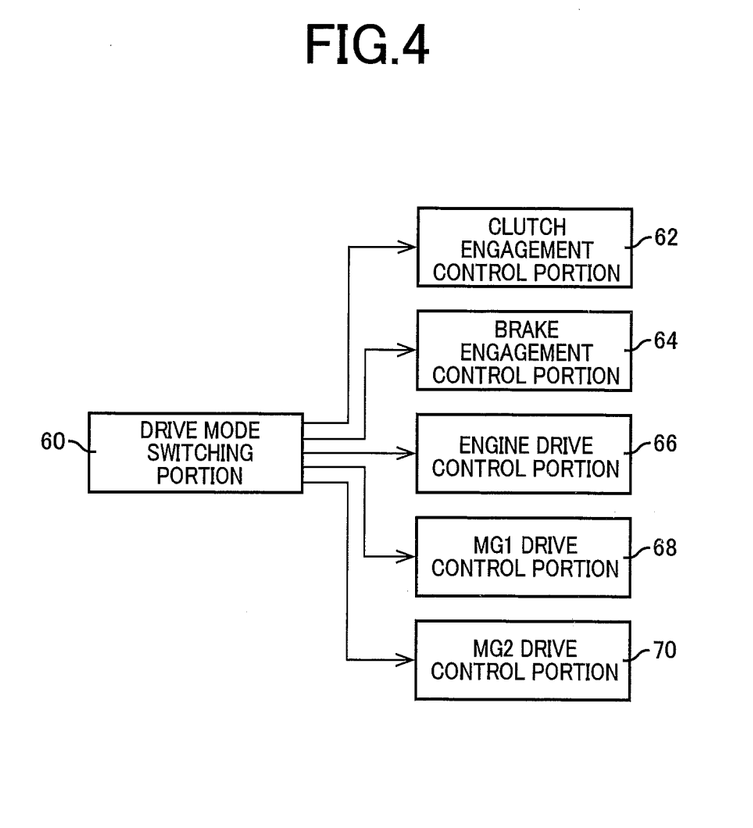
FIG. 4 is a functional block diagram illustrating major control functions of an electronic control device shown in FIG. 2.

FIG. 4 is the functional block diagram illustrating major control functions of the electronic control device 30. A drive mode switching portion 60 shown in FIG. 4 is configured to determine the drive mode of the drive system 10 that should be established. Described more specifically, the drive mode switching portion 60 selects one of the four drive modes indicated in FIG. 3, that is, the drive modes HV1, HV2, EV1 and EV2, on the basis of the accelerator pedal operation amount $A_{CC}$ detected by the accelerator pedal operation amount sensor 32, the vehicle running speed V corresponding to the output speed detected by the output speed sensor 40, the stored electric energy amount SOC of the battery 48 detected by the battery SOC sensor 42, etc., and according to a predetermined drive mode switching map.

The drive mode switching portion 60 establishes the selected one of the plurality of drive modes indicated in FIG. 3 according to the result of the determination: the hybrid drive modes HV1 and HV2 in which the output torque of the engine 12 and the output torque or torques of at least one of the first and second electric motors MG1 and MG2 are transmitted to the output gear 28; the EV drive mode EV1 in which the output torque of the second electric motor MG2 is transmitted to the output gear 28; and the EV drive mode EV2 in which the output torques of the first and second electric motors MG1 and MG2 are transmitted to the output gear 28.

A clutch engagement control portion 62 is configured to control the operating state of the clutch CL2 through the hydraulic control unit 54. Described more specifically, the clutch engagement control portion 62 controls an output hydraulic pressure of a solenoid control valve provided in the hydraulic control unit 54 to control the clutch CL2, for controlling the hydraulic pressure $P_{CL2}$ which determines the operating state (torque capacity) of the clutch CL2. The clutch engagement control portion 62 is preferably configured to control the operating state, i.e., the torque capacity of the clutch CL2, according to the drive mode selected by the drive mode switching portion 60. Namely, the clutch engagement control portion 62 is basically configured to control the torque capacity of the clutch CL2, so as to place the clutch CL2 in the engaged state when the drive mode switching portion 60 has determined that the drive system 10 should be switched to the drive mode HV2 or EV2, and so as to place the clutch CL2 in the released state when the drive mode switching portion 60 has determined that the drive system 10 should be switched to the drive mode HV1 or EV1.

A brake engagement control portion 64 is configured to control the operating state of the brake BK2 through the hydraulic control unit 54. Described more specifically, the brake engagement control portion 64 controls an output hydraulic pressure of a solenoid control valve provided in the hydraulic control unit 54 to control the brake BK2, for controlling the hydraulic pressure $P_{BK2}$ which determines the operating state (torque capacity) of the brake BK2. The brake engagement control portion 64 is preferably configured to control the operating state, i.e., the torque capacity of the brake BK2, according to the drive mode selected by the drive mode switching portion 60. Namely, the brake engagement control portion 64 is basically configured to control the torque capacity of the brake BK2, so as to place the brake BK2 in the engaged state when the drive mode switching portion 60 has determined that the drive system 10 should be switched to the drive mode HV1, EV1 or EV2, and so as to place the brake BK2 in the released state when the drive mode switching portion 60 has determined that the drive system 10 should be switched to the drive mode HV2.

An engine drive control portion 66 is configured to control an operation of the engine 12 through the engine control device 52. For instance, the engine drive control portion 66 commands the engine control device 52 to control an amount of supply of a fuel by the fuel injecting device of the engine 12 into an intake pipe, a timing of ignition (ignition timing) of the engine 12 by the igniting device, and the opening angle $\theta_{TH}$ of the electronic throttle valve, so that the engine 12 generates a required output, that is, a target torque (target engine output).

An MG1 drive control portion 68 is configured to control an operation of the first electric motor MG1 through the inverter 50. For example, the MG1 drive control portion 68 controls an amount of an electric energy to be supplied from the battery 48 to the first electric motor MG1 through the inverter 50, so that the first electric motor MG1 generates a required output, that is, a target torque (target MG1 output). An MG2 drive control portion 70 is configured to control an operation of the second electric motor MG2 through the inverter 50. For example, the MG2 drive control portion 70 controls an amount of an electric energy to be supplied from the battery 48 to the second electric motor MG2 through the inverter 50, so that the second electric motor MG2 generates a required output, that is, a target torque (target MG2 output).

In the hybrid chive modes in which the engine 12 is operated while the first and second electric motors MG1 and MG2 are used as the vehicle drive power source, a vehicle drive force required to be generated by the drive system 10 (output gear 28) to drive the hybrid vehicle is calculated on the basis of the accelerator pedal operation amount $A_{CC}$ detected by the accelerator pedal operation amount sensor 32, and the vehicle running speed V corresponding to the output speed $N_{OUT}$ detected by the output speed sensor 40. The operations of the first and second electric motors MG1 and MG2 are controlled by the MG1 and MG2 drive control portions 68 and 70, while the operation of the engine 12 is controlled by the engine drive control portion 66, so that the calculated required vehicle drive force is obtained by the output torque of the engine 12 and the output torques of the first and second electric motors MG1 and MG2.

The drive mode switching portion 60 switches the drive system 10 from the hybrid drive mode HV1 or HV2 to the EV drive mode EV2 if the stored electric energy amount of the battery 48 is equal to or larger than the predetermined threshold value α, and if the required vehicle drive force is equal to or larger than the predetermined threshold value β, and to the EV drive mode EV1 if the stored electric energy amount is smaller than the threshold value α, and/or if the required vehicle drive force is smaller than the threshold value β. In this connection, it is noted that the stored electric energy amount of the battery 48 is the electric energy amount SOC stored in (state of charge of) the battery 48, which is detected by the battery SOC sensor 42, while the required vehicle drive force is a target value of the drive force to be transmitted to the drive wheels of the hybrid vehicle provided with the drive system 10, namely, a value relating to the target vehicle drive force, which value corresponds to the accelerator pedal operation amount $A_{CC}$ detected by the accelerator pedal operation amount sensor 32, or the opening angle $\theta_{TH}$ of the electronic throttle valve, for example.

In other words, when the drive mode switching portion 60 determines that the drive system 10 should be switched from the hybrid drive mode HV1 or HV2 to the EV drive mode EV1 or EV2, as a result of a drop of the vehicle running speed V, for example, the drive mode switching portion 60 releases the clutch CL2 and engages the brake BK2 if the stored electric energy amount of the battery 48 is smaller than the threshold value α and/or if the required vehicle drive force is smaller than the threshold value β, to establish the EV drive mode EV1 in which only the second electric motor MG2 is operated as the vehicle drive power source. If the stored electric energy amount of the battery 48 is equal to or larger than the threshold value α and if the required vehicle drive force is equal to or larger than the threshold value β, the drive mode switching portion 60 engages both of the clutch CL2 and the brake BK2 to establish the EV drive mode EV2 in which both of the first and second electric motors MG1 and MG2 are operated as the vehicle drive power source.

The clutch engagement control portion 62 is preferably configured to engage the clutch CL2 if the stored electric energy amount of the battery 48 is equal to or larger than the threshold value α when the drive mode switching portion 60 has determined that the drive system 10 should be switched from the hybrid drive mode HV1 or HV2 to the EV drive mode EV1 or EV2. That is, the clutch engagement control portion 62 implements a control to increase the torque capacity of the clutch CL2 through the hydraulic control unit 54, before the EV drive mode EV2 is eventually established.

Figure 5:
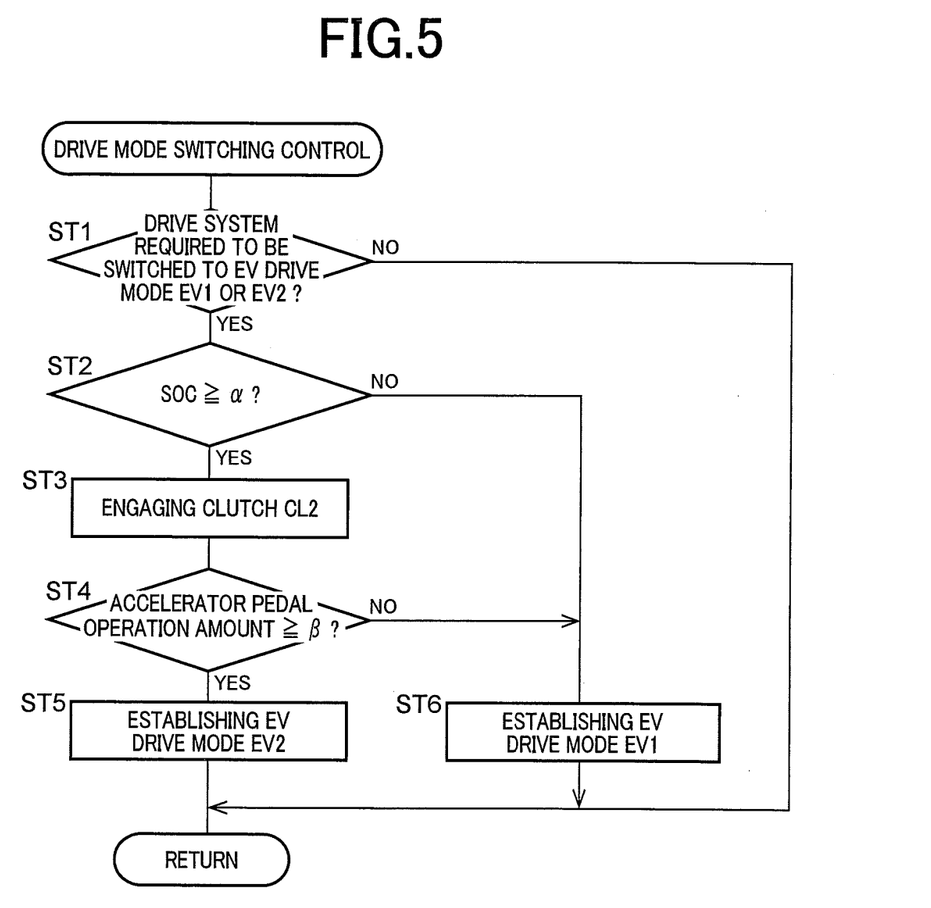
FIG. 5 is a flow chart illustrating a major portion of one example of a drive mode switching control implemented by the electronic control device shown in FIG. 2.

FIG. 5 is the flow chart illustrating a major portion of one example of a drive mode switching control implemented by the electronic control device 30. The drive mode switching control is repeatedly implemented with a predetermined cycle time.

The drive mode switching control is initiated with step ST1 to determine whether the drive system 10 is required to be switched to the EV drive mode EV1 or EV2. If a negative determination is obtained in the step ST1, the present control routine is terminated. If an affirmative determination is obtained in the step ST1, the control flow goes to step ST2 to determine whether the stored electric energy amount SOC of the battery 48 detected by the battery SOC sensor 42 is equal to or larger than the predetermined threshold value α. If an affirmative determination is obtained in the step ST2, the control flow goes to step ST3 to increase the torque capacity of the clutch CL2 disposed in a power transmitting path between the engine 12 and the output gear 28. Then, the control flow goes to step ST4 to determine whether the accelerator pedal operation amount $A_{CC}$ detected by the accelerator pedal operation amount sensor 32 is equal to or larger than the predetermined threshold value β. If an affirmative determination is obtained in the step ST4, the control flow goes to step ST5 to engage both of the clutch CL2 and the brake BK2 for switching the drive system 10 to the EV drive mode EV2. If a negative determination is obtained in the step ST2 or ST4, the control flow goes to step ST6 to release the clutch CL2 and engage the brake BK2 for switching the drive system 10 to the EV drive mode EV1. The present control routine is terminated after implementation of the step ST5 or ST6. It will be understood that the steps ST1, ST2 and ST4-ST6 correspond to the operations of the drive mode switching portion 60, and the steps ST3, ST5 and ST6 correspond to the operation of the clutch engagement control portion 62, while the steps ST5 and ST6 correspond to the operation of the brake engagement control portion 64.

Another preferred embodiment of the present invention will be described in detail by reference to the drawings. In the following description, the same reference signs will be used to identify the same elements in the different embodiments, which will not be described redundantly.

Second Embodiment

Figure 6:
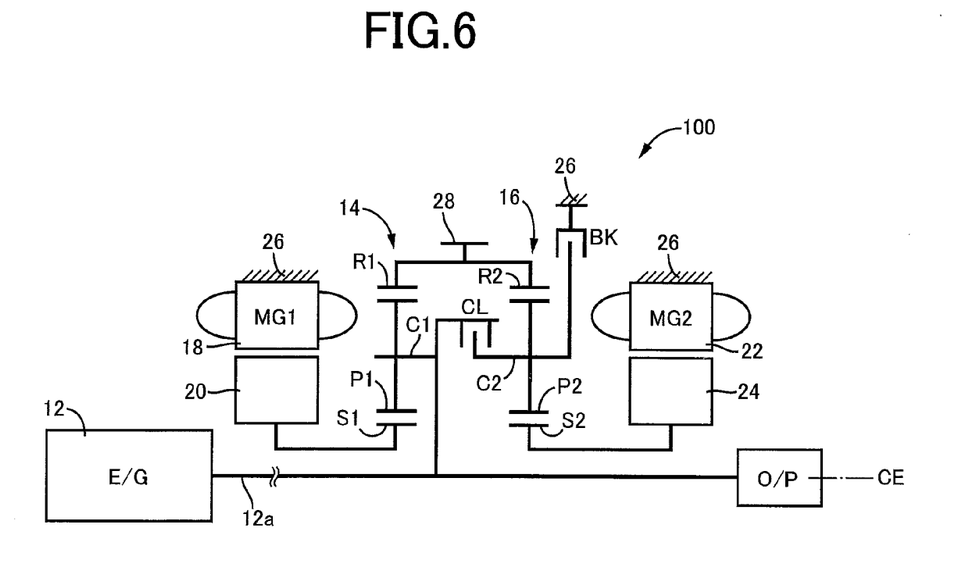
FIG. 6 is a schematic view showing an arrangement of another hybrid vehicle drive system to which the present invention is suitably applicable.

FIG. 6 is the schematic view showing an arrangement of another hybrid vehicle drive system 100 (hereinafter referred to simply as a "drive system 100") to which this invention is suitably applicable. In the present drive system 100, the rotor 20 of the first electric motor MG1 is fixed to the sun gear S1 of the first planetary gear set 14, and the crankshaft 12a of the engine 12 is fixed to the carrier C1 of the first planetary gear set 14. The ring gear R1 of the first planetary gear set 14 and the ring gear 112 of the second planetary gear set 16 are fixed to each other, while the rotor 24 of the second electric motor MG2 is fixed to the sun gear S2 of the second planetary gear set 16. The ring gear R1 of the first planetary gear set 14 and the ring gear R2 of the second planetary gear set 16 which are fixed to each other are fixed to the output rotary member in the form of the output gear 28. The carrier C1 of the first planetary gear set 14 and the carrier C2 of the second planetary gear set 16 are selectively connectable to each other through the clutch CL. The carrier C2 of the second planetary gear set 16 can be selectively fixed to the stationary member in the form of the housing 26 through the brake BK.

Each of the clutch CL and brake BK is preferably a hydraulically operated coupling device the operating state of which is controlled (which is engaged and released) according to the hydraulic pressure applied thereto from the hydraulic control unit 54. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from the electronic control device 30. In the present embodiment, the clutch CL serves as a clutch for selectively connecting the carrier C1 of the first planetary gear set 14 and the carrier C2 of the second planetary gear set 16 to each other, while the brake BK serves as a brake for selectively fixing the carrier C2 of the second planetary gear set 16 to the stationary member in the form of the housing 26.

Figure 7:
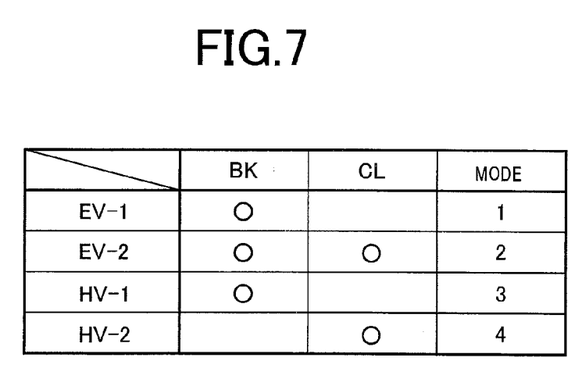
FIG. 7 is a table indicating combinations of the operating states of the clutch and the brake, which correspond to the respective four vehicle drive modes to be established in the drive system of FIG. 6.

In the hybrid vehicle provided with the drive system 100 constructed as described above, one of the plurality of drive modes is selectively established according to the operating states of the engine 12 and the first and second electric motors MG1 and MG2, and the operating states of the clutch CL and brake BK. FIG. 7 is the table indicating combinations of the operating states of the clutch CL and brake BK, which correspond to the respective four drive modes of the drive system 100. In this table, "o" marks represent the engaged states of the clutch CL and brake BK while blanks represent their released states. Drive modes EV-1 and EV-2 indicated in FIG. 7 are EV drive modes in which the engine 12 is held at rest while at least one of the first and second electric motors MG1 and MG2 is used as a vehicle drive power source. Drive modes HV-1 and HV-2 are hybrid drive modes in which the engine 12 is operated as the vehicle drive power source while the first and second electric motors MG1 and MG2 are operated as needed to generate a vehicle drive force and/or an electric energy. In these hybrid drive modes, at least one of the first and second electric motors MG1 and MG2 may be operated to generate a reaction force or placed in a non-loaded free state.

As is apparent from FIG. 7, the EV drive modes of the drive system 100 in which the engine 12 is held at rest while at least one of the first and second electric motors MG1 and MG2 is used as the vehicle drive power source consist of: a mode 1 (drive mode 1) in the form of the drive mode EV-1 which is established in the engaged state of the brake BK and in the released state of the clutch CL; and a mode 2 (drive mode 2) in the form of the drive mode EV-2 which is established in the engaged states of both of the brake BK and clutch CL. The hybrid drive modes in which the engine 12 is operated as the vehicle drive power source while the first and second electric motors MG1 and MG2 are operated as needed to generate a vehicle drive force and/or an electric energy, consist of: a mode 3 (drive mode 3) in the form of the drive mode HV-1 which is established in the engaged state of the brake BK and in the released state of the clutch CL; and a mode 4 (drive mode 4) in the form of the drive mode HV-2 which is established in the released state of the brake BK and in the engaged state of the clutch CL.

In the drive mode EV-1 indicated in FIG. 7, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is fixed to the stationary member in the form of the housing 26, so that the rotating speed of the carrier C2 is held at zero. In this drive mode EV-1, the rotating directions of the sun gear S2 and the ring gear R2 in the second planetary gear set 16 are opposite to each other, so that the ring gear R2, that is, the output gear 28 is rotated in a positive direction by a negative torque (a torque in the negative direction) generated by the second electric motor MG2, namely, the hybrid vehicle provided with the drive system 100 is driven in the forward direction by the negative torque generated by the second electric motor MG2. In this case, the first electric motor MG1 is preferably placed in a free state. In this drive mode EV-1, the carriers C1 and C2 are permitted to be rotated relative to each other, so that the hybrid vehicle can be driven in the EV drive mode similar to an EV drive mode which is established in a vehicle provided with a so-called "THS" (Toyota Hybrid System) and in which the carrier C2 is fixed to the stationary member.

In the drive mode EV-2 indicated in FIG. 7, the carrier C1 of the first planetary gear set 14 and the carrier C2 of the second planetary gear set 16 are not rotatable relative to each other in the engaged state of the clutch CL. In the engaged state of the brake BK, the carrier C2 of the second planetary gear set 16 and the carrier C1 of the first planetary gear set 14 which are connected to each other are fixed to the stationary member in the form of the housing 26, so that the rotating speeds of the carriers C1 and C2 are held at zero. In this drive mode EV-2, the rotating directions of the sun gear S1 and the ring gear R1 in the first planetary gear set 14 are opposite to each other, and the rotating directions of the sun gear S2 and the ring gear R2 in the second planetary gear set 16 are opposite to each other. Namely, the ring gears R1 and R2, that is, the output gear 28 is rotated in the positive direction by a negative torque (a torque in the negative direction) generated by the first electric motor MG1 or the second electric motor MG2, that is, the hybrid vehicle provided with the drive system 100 is driven in the forward direction by the negative torque generated by at least one of the first and second electric motors MG1 and MG2.

In the drive mode HV-1 indicated in FIG. 7, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is fixed to the stationary member in the form of the housing 26, so that the rotating speed of the carrier C2 is held at zero. In this drive mode HV-1, the engine 12 is operated, and the output gear 28 is rotated by an output torque of the engine 12. In this case, the first electric motor MG1 is operated to generate a reaction torque, to permit the output of the engine 12 to be transmitted to the output gear 28 in the first planetary gear set 14. In the engaged state of the brake BK, the rotating directions of the sun gear S2 and the ring gear R2 in the second planetary gear set 16 are opposite to each other, namely, the ring gears R1 and R2, that is, the output gear 28 is rotated in the positive direction by a negative torque (a torque in the negative direction) generated by the second electric motor MG2.

In the drive mode HV-2 indicated in FIG. 7, the carrier C1 of the first planetary gear set 14 and the carrier C2 of the second planetary gear set 16 are not rotatable relative to each other due to the engaged state of the clutch CL, so that the carriers C1 and C2 serve as a single rotary component. The ring gears R1 and R2 which are fixed to each other serve as a single rotary component. That is, the first and second planetary gear sets 14 and 16 cooperate to function as a differential device having four rotary components when the drive system 100 is placed in the drive mode HV-2.

In the present second embodiment, the drive modes HV-1 and HV-2 indicated in FIG. 7 correspond to hybrid drive modes in which the output torque of the engine 12 and the output torque or torques of at least one of the first and second electric motors MG1 and MG2 are transmitted to the output gear 28, and the drive mode EV-1 corresponds to a first EV drive mode in which only the output torque of the second electric motor MG2 of the engine 12, the first electric motor MG1, and the second electric motor MG2 is transmitted to the output gear 28, while the drive mode EV-2 corresponds to a second EV drive mode in which the output torques of the first and second electric motors MG1 and MG2 are transmitted to the output gear 28.

When the drive mode switching portion 60 switches the drive system 10 from the hybrid drive mode HV-1 or HV-2 to the EV drive mode EV-2 if the stored electric energy amount of the battery 48 is equal to or larger than a predetermined threshold value $\alpha$, and if the required vehicle drive force is equal to or larger than a predetermined threshold value $\beta$, and to the EV drive mode EV-1 if the stored electric energy amount is smaller than the threshold value $\alpha$, and/or if the required vehicle drive force is smaller than the threshold value $\beta$.

In other words, when the drive mode switching portion 60 determines that the drive system 10 should be switched from the hybrid drive mode HV-1 or HV-2 to the EV drive mode EV-1 or EV-2, as a result of a drop of the vehicle running speed V, for example, the drive mode switching portion 60 releases the clutch CL and engages the brake BK if the stored electric energy amount of the battery 48 is smaller than the threshold value $\alpha$ and/or if the required vehicle drive force is smaller than the threshold value $\beta$, to establish the EV drive mode EV-1 in which only the second electric motor MG2 is operated as the vehicle drive power source. If the stored electric energy amount of the battery 48 is equal to or larger than the threshold value $\alpha$ and if the required vehicle drive force is equal to or larger than the threshold value $\beta$, the drive mode switching portion 60 engages both of the clutch CL and the brake BK to establish the EV drive mode EV-2 in which both of the first and second electric motors MG1 and MG2 are operated as the vehicle drive power source.

The clutch engagement control portion 62 is preferably configured to engage the clutch CL if the stored electric energy amount of the battery 48 is equal to or larger than the threshold value $\alpha$ when the drive mode switching portion 60 has determined that the drive system 10 should be switched from the hybrid drive mode HV-1 or HV-2 to the EV drive mode EV-1 or EV-2. That is, the clutch engagement control portion 62 implements a control to increase the torque capacity of the clutch CL through the hydraulic control unit 54, before the EV drive mode EV-2 is eventually established.

In the illustrated embodiments, the drive mode switching portion 60 is configured to switch the hybrid vehicle drive system from the hybrid drive mode HV1 (HV-1) or HV2 (HV-2) to the first EV drive mode EV1 (EV-1) if the electric energy amount stored in the battery 48 is smaller than the predetermined threshold value $\alpha$ or if the vehicle drive force required to be generated by the drive system 10 is smaller than the predetermined threshold value $\beta$, and to the second EV drive mode EV2 (EV-2) if the electric energy amount stored in the battery 48 is equal to or larger than the threshold value $\alpha$ and if the required vehicle drive force is equal to or larger than the threshold value $\beta$, when the drive mode switching portion 60 has determined that the hybrid vehicle drive system should be switched from the hybrid drive mode HV1 (HV-1) or HV2 (HV-2) to the first EV drive mode EV1 (EV-1) or the second EV drive mode EV2 (EV-2). Thus, the drive system 10 is placed in the second EV drive mode EV2 (EV-2) when the required vehicle drive force is relatively large while the electric energy amount stored in the battery 48 is sufficiently large, so that it is possible to effectively reduce deterioration of the drivability of the hybrid vehicle due to a change of the vehicle drive mode during acceleration of the hybrid vehicle. Namely, the illustrated embodiments provide a control apparatus in the form of the electronic control device 30 for the hybrid vehicle drive system 10 (100), which permits effective reduction of deterioration of the drivability of the hybrid vehicle.

The drive system 10 (100) to be controlled by the control apparatus according to the illustrated embodiments is configured such that one of the four rotary components of the differential device consisting of the first and second planetary gear sets 14 and 16 is constituted by the rotary element in the form of the carrier C1 of the first planetary gear set 14 and the rotary element in the form of the ring gear R2 (carrier C2) of the second planetary gear set 16 which are selectively connected to each other through the clutch CL2 (CL), while the rotary element in the form of the ring gear R2 (carrier C2) of the second planetary gear set 16 which is selectively connected to the carrier C1 of the first planetary gear set 14 through the clutch CL2 (CL) is selectively fixed to the stationary member in the form of the housing 26 through the brake BK2 (BK). Further, the electronic control device 30 includes the clutch engagement control portion 62 configured to place the clutch CL2 (CL) in the engaged state when the electric energy amount stored in the battery 48 is equal to or larger than the predetermined threshold value $\alpha$. Accordingly, the clutch CL2 (CL) is brought into the engaged state when the drive system 10, 100 is expected to be switched to the second EV drive mode EV2 (EV-2) while the electric energy amount stored in the battery 48 is sufficiently large, so that it is possible to effectively prevent deterioration of the drivability of the hybrid vehicle due to a delayed engaging action of the clutch CL2 (CL).

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

10: Hybrid vehicle drive system
12: Engine
14: First planetary gear set (First differential mechanism)
16: Second planetary gear set (Second differential mechanism)
26: Housing (Stationary member)
28: Output gear (Output rotary member)
30: Electronic control device
48: Battery
60: Drive mode switching portion
62: Clutch engagement control portion
BK: Brake
BK2: Brake
C1: Carrier (Second rotary element)
C2: Carrier (Second rotary element)
CL: Clutch
CL2: Clutch
MG1: First electric motor
MG2: Second electric motor R1: Ring gear (First rotary element)
R2: Ring gear (First rotary element)
S1: Sun gear (Third rotary element)
S2: Sun gear (Third rotary element)

The invention claimed is:

1. A control apparatus for a hybrid vehicle drive system including: (i) a differential device including a first differential mechanism, a second differential mechanism and four rotary components, (ii) an engine, (iii) a first electric motor, (iv) a second electric motor and (v) an output rotary member which are respectively connected to the four rotary components, the control apparatus comprising:
  a drive mode switching portion configured to place the hybrid vehicle drive system in one of:
    a hybrid drive mode in which an output torque of the engine and an output torque of at least one of the first electric motor and the second electric motor are transmitted to the output rotary member;
    a first EV drive mode in which only the output torque of the second electric motor is transmitted to the output rotary member; and
    a second EV drive mode in which only the output torques of the first electric motor and the second electric motor are transmitted to the output rotary member, wherein
  the drive mode switching portion is further configured to switch the hybrid vehicle drive system from the hybrid drive mode to either the first EV drive mode or the second EV drive mode, the drive mode switching portion determines that the hybrid vehicle drive system should be switched from the hybrid drive mode to:
    the first EV drive mode when an electric energy amount stored in a battery is smaller than a predetermined battery threshold value, or when a vehicle drive force generated by the hybrid vehicle drive system is smaller than a predetermined drive force threshold value, and
    the second EV drive mode when the electric energy amount stored in the battery is equal to or larger than the battery threshold value, and when the drive force required to drive the hybrid vehicle is equal to or larger than the drive force threshold value.

2. The control apparatus according to claim 1, wherein
  one of the four rotary components is a rotary element of the first differential mechanism and a rotary element of the second differential mechanism which are selectively connected to each other through a clutch,
  one of the rotary elements of the first differential mechanism and the second differential mechanism that are selectively connected to each other through the clutch is selectively connected to a stationary member through a brake, and
  the control apparatus further comprises a clutch engagement control portion configured to place the clutch in an engaged state when the electric energy amount stored in the battery is equal to or larger than the predetermined battery threshold value.

* * * * *